Sept. 20, 1971  C. A. THOMAS ET AL  3,605,695

MILKER SUPPORT WITH CAM LOCK

Filed Aug. 20, 1969  2 Sheets-Sheet 1

INVENTORS
Chester A. Thomas
Robert J. Shulick
BY Hofgren, Wegner, Allen, Stellman & McCord
ATTORNEYS

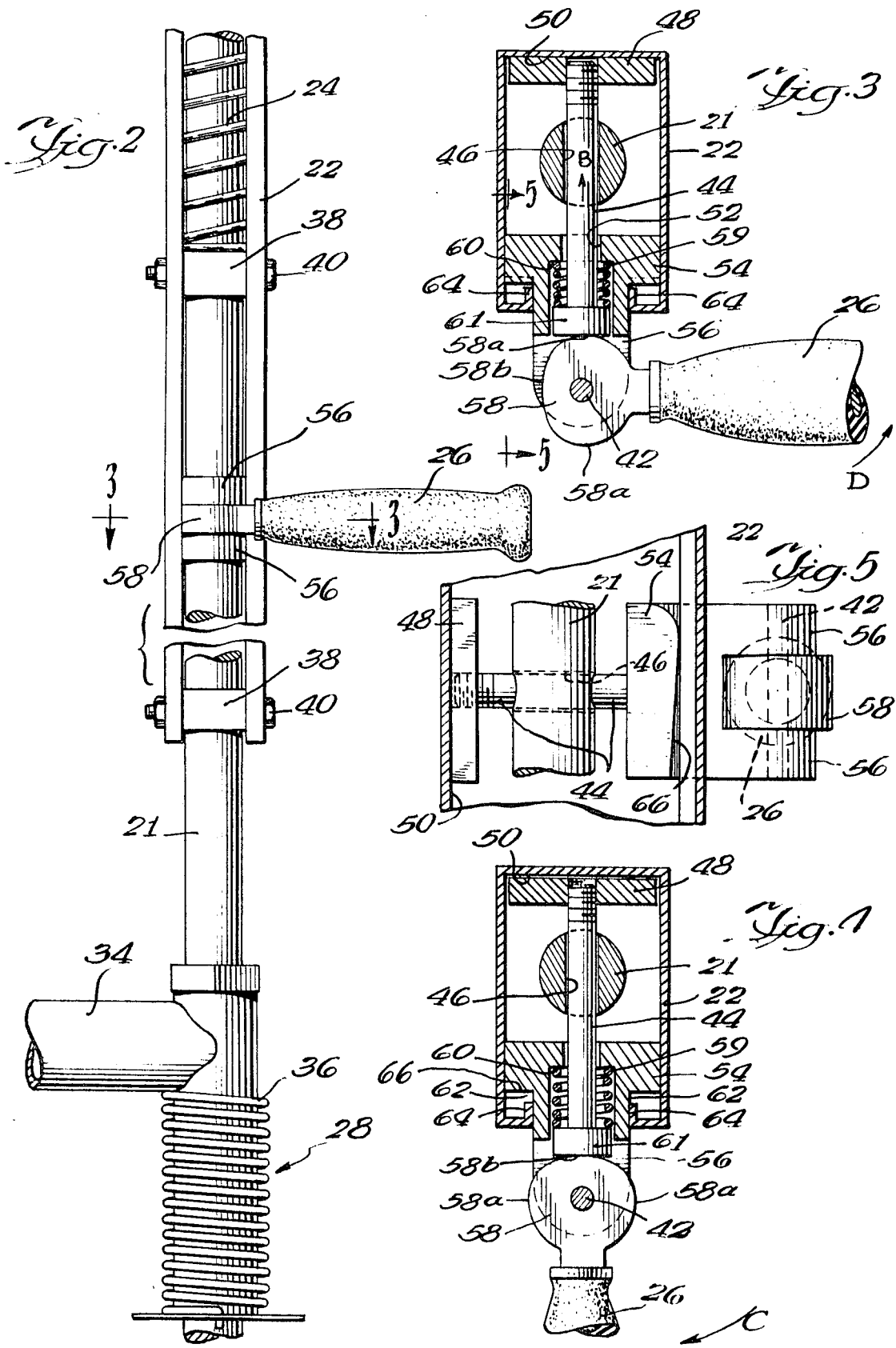

United States Patent Office 3,605,695
Patented Sept. 20, 1971

3,605,695
MILKER SUPPORT WITH CAM LOCK
Chester A. Thomas, Lake Forest, and Robert J. Shulick,
St. Charles, Ill., assignors to Babson Bros. Co.
Filed Aug. 20, 1969, Ser. No. 851,640
Int. Cl. A01j 7/00
U.S. Cl. 119—14.1                                    6 Claims

ABSTRACT OF THE DISCLOSURE

A mechanism for adjustably supporting a milking apparatus, including a vertically disposed elongated member which is constrained for longitudinal movement in a vertical channel member and which carries the milking apparatus for vertical movement therewith beneath a cow. A lever is movable with the elongated member and has an eccentric cam portion which cooperates operatively with a cam means associated with the elongated member and the channel member to retain the elongated member in any one of a plurality of different elevational positions in response to movement of the lever.

BACKGROUND AND SUMMARY OF THE INVENTION

This invention relates to a milker support and in particular to means for adjustably supporting automatic milking apparatus during a milking operation.

In carry-away milking systems, milk is withdrawn from the cow's teats through a teat cup assembly attached thereto and connected through suitable means to a carry-away pipeline. To provide a proper tug and pull action on the cow's teats, it is desirable to support the teat cup assembly at a proper elevation and in a manner allowing a downward and forward force to be exerted, through the teat cups, on the cow's teats. Forms of such apparatus are shown in the Thomas Pat. 2,783,737, issued Mar. 5, 1967, and the Babson Pat. 3,033,161, issued May 8, 1962.

In the above Thomas patent, adjustment of the elevation of the milk receiving receptacle is effected through a rack and gear arrangement, with the gear operated by a handle to effect vertical adjustment of a post on which the receptacle is carried. In the Babson patent, a pivoted lever is secured to the vertically adjustable post, and a member having a plurality of vertically spaced, horizontal opening notches removably receives the lever to hold the lever against vertical movement. The Babson patent also includes a spring arrangement to counterbalance the weight of the milking apparatus and the carrying means and urge the milking apparatus to a predetermined desired elevation.

The instant invention relates to an improved means for adjusting the elevation of the milk receiving receptacle so that a proper tug and pull action may be effected with any one of a plurality of cows having udders depending to different elevations.

A principal object of the invention is to provide such a means having a simplified structure permitting improved ease of operation and maintenance.

Another object of the invention is to provide a mechanism for adjustably supporting a milking apparatus and including a vertically disposed elongated member, means constraining the elongated member for longitudinal movement, a lever movable with the elongated member, locking means operable by the lever to releasably retain the elongated member in any one of a plurality of different elevational positions, and means associated with the elongated member for carrying a milking apparatus thereon. The locking means includes a cam means operably associated with the elongated member and the constraining means to retain the member relative to the constraining means in any one of said positions in response to movement of the lever.

A further object of the invention is to provide a mechanism as set forth in the preceding paragraph wherein said cam means is movably mounted on the elongated member adjacent the lever for longitudinal movement with the elongated member and for movement into locking engagement with the constraining means in response to movement of the lever.

Still another object of the invention is to provide a mechanism as set forth in the preceding paragraph wherein the cam means comprises a locking pin means extending through the elongated member generally transverse to the longitudinal movement thereof and movable relative thereto into locking engagement with the constraining means. The lever is movable against one end of the pin means to move the opposite end of the pin means into frictional locking engagement with the constraining means.

Yet a further object of the invention is to provide a mechanism as set forth in the preceding paragraph wherein the lever is mounted for pivotal movement about an axis spaced from the elongated member, and including an eccentric portion on the lever movable into engagement with the one end of the pin means.

Other objects, features and advantages of the invention will become apparent from the following detailed description taken in connection with the accompanying drawings.

DESCRIPTION OF THE DRAWINGS

FIG. 2 is a partial elevation, on an enlarged scale, of the vertically adjustable mechanism of the invention;

FIG. 3 is a horizontal section taken generally along the line 3—3 of FIG. 2, with the lever and cam means in a position wherein the vertically adjustable elongated member is in its locking engagement with the constraining channel member;

FIG. 4 is a section similar to that of FIG. 3 with the lever and cam means in a position wherein the vertically adjustable elongated member is released from its locking engagement with the constraining channel member; and FIG. 5 is a partial vertical section taken generally along the line 5—5 of FIG. 3.

DESCRIPTION OF THE INVENTION

Figure 1:
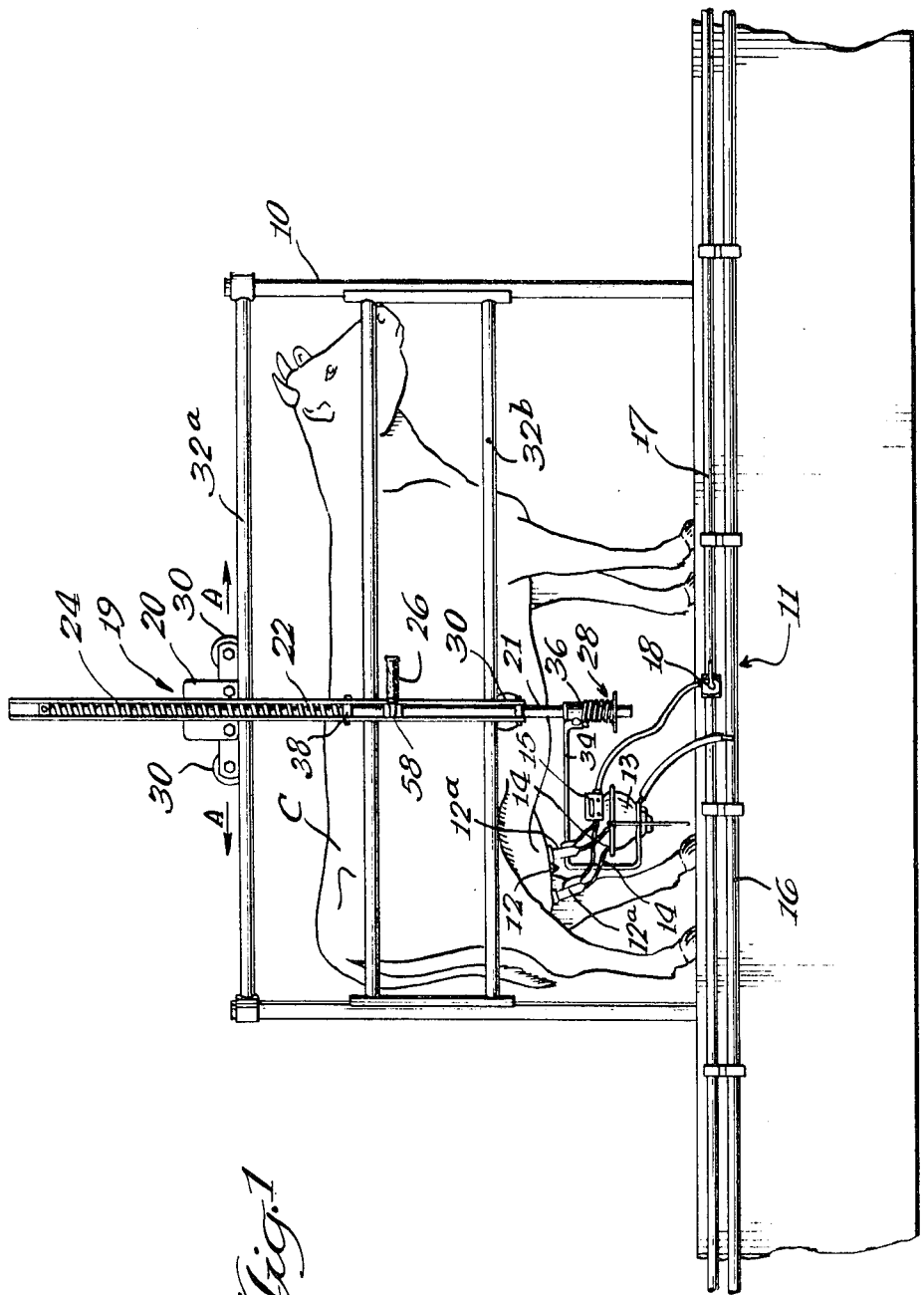
FIG. 1 is an elevation of a portion of a milking parlor showing a cow being milked by a carry-away milking apparatus supported by a mechanism embodying the invention.

In the embodiment of the invention illustrated in the drawings, a cow C, in a milking parlor stall 10, is shown being machine-milked with a carry-away milking system generally designated 11. In such a milking system, a teat cup assembly, generally designated 12, including teat cups 12a of conventional construction, are attached to the cow's teats to deliver milk from the teats to a receptacle 13 through suitable interconnecting milk tubes 14. Associated with receptacle 13 is a pulsator 15 which provides a periodic vacuum condition within the shells of teat cups 12a to facilitate the automatic withdrawal of the milk. From the receptacle 13, the milk is delivered to a suitable carry-away milk pipeline 16. A vacuum pipeline 17 extends adjacent milk pipeline 16 and is connected to pulsator 15 through a suitable valve 18.

Milking parlor stall 10 is so arranged that upon completion of a milking operation and removal of teat cups 12a from the cow's teats, the cow may leave the stall, permitting another cow to be admitted to the stall for subsequent milking operation. As the height of the udders of different cows may vary substantially, it is desirable to provide means for supporting the receptacle 13 at correspondingly different elevations. To provide a tug and pull action on the cow's teats during a milking operation, it is desirable to adjust the elevation of receptacle 13 accurately to permit a downward and forward biasing thereof exerting a steady downward and forward force which is converted into the proper periodic tug and pull action on the cow's teats by the pulsating vacuum action effected by pulsator 15.

More specifically, the means for carrying receptacle 13 comprises a mechanism, generally designated 19, including a support 20 fixed on stall 10, a vertically disposed elongated member or rod 21 vertically movable within a channel-shaped constraining means 22 mounted on support 20, a spring 24 biasing rod 21 to a predetermined upper position, a lever 26 for manually adjusting the position of rod 21, a carrying means 28 for supporting receptacle 13 on one end of rod 21, and a locking means (shown in FIGS. 3 and 4 and to be described in greater detail hereinafter) operably associated with the lever 26 to releasably retain the rod 21 in any one of a plurality of different elevational positions within the constraining channel 22.

In urging rod 21 upwardly, spring 24 counter-balances the weight of rod 21, lever 26, carrying means 28, and the elements of the milking system 11 supported by carrying means 28 to dispose receptacle 13 at a predetermined elevation which may correspond to a selected udder height, such as the medium udder height of the group of cows to be milked. When the udder of a cow to be milked is lower than the medium height, the operator pivots lever 26 and urges the lever downwardly against the biasing action of spring 24 to position receptacle 13 at the proper lower elevation for that cow. Alternatively, if the udder of the cow is higher than the median elevation, the lever 26 is urged upwardly from the counterbalance position to place the receptacle at the correspondingly proper higher elevation. As the supported weight is counterbalanced originally by spring 24, the force necessary to effect an upward or downward movement of the mechanism is independent of the weight and is a function only of the spring constant which is preferably relatively low.

The support 20 to which the constraining channel 22 is fixed, is mounted by means of rollers 30 on upper and lower horizontal cross members 32a and 32b, respectively, of stall 10. This permits the entire adjusting mechanism and the supported milking apparatus to be moved in the directions of arrows A (FIG. 1) to properly position the milking apparatus front-to-rear beneath the cow.

The carrying means 38 includes an arm 34 which has the receptacle 13 mounted on the free end thereof and which is uged by a spring 36 (in a known manner) forwardly of the cow's udder to exert a forward force, through the teat cups 12a, on the cow's teats as the rod 21 is vertically adjusted to exert a downward force on the cow's teats, thereby to provide a proper forward and downward tug and pull action on the teats.

Referring to FIG. 3, the rod 21 moves vertically through a pair of bearings 38 fixed to the constraining channel member 22 by volts 40.

Referring to FIGS. 3 through 5, the improved locking means of this invention is a cam type mechanism operably associated with the rod 21, the constraining channel 22, and the lever 26 to releasably retain the rod 21 relative to the channel 22 in any one of a plurality of different elevational positions, in response to pivotal movement of the lever 26 about a pivot shaft 42. The cam mechanism includes a lock pin member 44 which extends through the rod 21 generally transverse to the longitudinal movement thereof and movable relative thereto in a bore 46 to bring a flat locking plate portion 48 on the inner end of the locking pin into locking engagement with the interior rear or back wall 50 of the constraining channel 22. The locking pin 44 also extends through a bore 52 in a mounting block 54, within channel 22, and has the end thereof opposite the locking plate 48 exposed on the exterior of the mounting block 54 between a pair of ears 56 of the mounting block. The pivot shaft 42 for the lever 26 extends between the mounting block ears 56 generally in line with the locking pin 44 which is freely movable longitudinally within the mounting block bore 52. The lever 26 has an eccentric cam portion 58 on the side of the pivot shaft 42 opposite the handle portion of the lever. The eccentric cam portion 58 defines an eccentric camming surface which has surface portions 58a which are disposed a greater distance away from the pivot shaft 42 than surface portion 58b. The surface portions 58a are operable in response to pivotal movement of the lever 26 about shaft 42 to abut against the exposed outer end of the locking pin means 44 to move the pin means in the direction of arrow B (FIG. 3) and move the locking plate portion 48 into a frictional locking engagement with the back wall 50 of the channel member 22. A coil spring 59 is provided about pin 44 so as to urge the pin outwardly opposite the direction of arrow A. The spring is biased between a shoulder 60 on the mounting block and a head portion 61 on the outer end of the pin 44. Referring to FIG. 4, sufficient clearance, as at 62, is provided between a pair of inturned flange portions 64 of the channel member 22 and the mounting block 54 for the lever 26 to permit the mounting block to slide with ease vertically within the channel 22. Referring specifically to FIG. 5, a front vertical surface 66 of the mounting block 54 is inclined inwardly and downwardly to prevent binding when the milking apparatus is moved downwardly under the urging of spring 24.

In operation, when the udder of a cow to be milked is lower than the median height, referred to above, the operator pivots the lever 26 about pivot shaft 42 in the direction of arrow C (FIG. 4) to the position shown in FIG. 4 to release the frictional locking engagement between the locking plate 48 and the back wall 50 of the channel member 22. The pin is urged outwardly against the surface portion 58b of the cam 58 by the spring 59. The operator then urges the lever 26 downwardly against the biasing action of spring 24 to position receptacle 13 at the proper lower elevation for that cow. When the proper lower elevation is reached, the lever 26 is pivoted about pivot shaft 42 (e.g. in the direction of arrow D in FIG. 3) to bring either surface portion 58a of the cam portion 58 of the lever into engagement with the exposed outer end of the locking pin 44 and continued pivoting of the lever 26 moves the pin in the direction of arrow B (FIG. 3) into the aforesaid locking condition shown in FIGS. 3 and 5. Alternatively, if the udder of the cow is higher than the median elevation, lever 26 again is rotated in the direction of arrow C to establish the release condition of the parts as shown in FIG. 4 and the lever is urged upwardly from the counterbalance position to place the receptacle at the correspondingly proper higher elevation at which elevation the lever 26 again is pivoted (e.g. in the direction of arrow D) to establish the locking condition of the respective parts as shown in FIGS. 4 and 5.

The foregoing detailed description has been given for clearness of understanding only and no unnecessary limitations should be understood therefrom as some modifications will be obvious to those skilled in the art.

We claim:

1. In a mechanism for adjustably supporting a milking apparatus, including a vertically disposed elongated member, means constraining said member for longitudinal movement, a graspable lever pivotally secured to said elongated member on an axis spaced from said elongated member for longitudinal movement therewith and for pivotal movement relative thereto, and means associated with the elongated member for carrying a milking apparatus thereon, the improvement comprising an eccentric means operably associated with said lever, said elongated member and said constraining means to releasably retain the elongated member at selected elevational positions relative to the constraining means in response to pivotal movement of the lever.

2. The mechanism of claim 1 wherein said eccentric means is formed by means on said lever and movable therewith about an axis spaced from said longitudinal member to effect a locking frictional engagement between said longitudinal member and said constraining means in response to pivotal movement of the lever.

3. A mechanism for adjustably supporting a milking apparatus, comprising: a vertically disposed elongated member, means associated with the elongated member for carrying a milking apparatus thereon, means constraining the elongated member for longitudinal movement to adjust the elevational position of the milking apparatus, a lever pivotally secured to said elongated member for longitudinal movement therewith and for pivotal movement relative thereto about an axis spaced from the elongated member, said lever including a handle portion extending transversely away from said pivot axis for grasping to move the elongated member longitudinally relative to said constraining means, and locking means operable by said lever to releasably retain the elongated member at selected elevational positions with respect to said constraining means, said locking means including an eccentric cam portion on said lever and a movable locking portion engageable by the eccentric cam portion of said lever for movement into locking engagement with said constraining means to retain the elongated member relative to the constraining means in any of said selected elevational positions in response to pivotal movement of said lever.

4. The mechanism of claim 3 wherein the movable locking portion of said locking means comprises a pin member extending through said elongated member generally transverse to the longitudinal movement thereof and movable relative thereto into locking engagement with the constraining means in any one of said positions.

5. The mechanism of claim 4 including means mounting said lever for movement of the eccentric cam portion thereof against one end of said pin means to move the opposite end of the pin means into locking engagement with the constraining means.

6. The mechanism of claim 5 wherein said constraining means has means defining a generally flat vertically disposed wall facing said elongated member, and including a generally flat locking plate on said opposite end of said pin means to effect a locking frictional engagement between the wall and the plate when the pin means is moved by the eccentric cam portion of said lever.

References Cited
UNITED STATES PATENTS

| | | | |
|---|---|---|---|
| 527,893 | 10/1894 | Smart | 119—14.1 |
| 2,357,373 | 9/1944 | Anderson | 119—14.45X |
| 2,775,224 | 12/1956 | Rawson et al. | 119—14.13 |
| 3,033,161 | 5/1962 | Babson | 119—14.13 |

ALDRICH F. MEDBERY, Primary Examiner

U.S. Cl. X.R.

119—14.13, 14.45